United States Patent
Adler et al.

(10) Patent No.: US 6,217,148 B1
(45) Date of Patent: *Apr. 17, 2001

(54) METHOD FOR OPERATING AN INK JET PRINTER

(75) Inventors: Uri Adler, Holon; Gershon Miller, Rehovot, both of (IL)

(73) Assignee: Idanit Technologies Ltd., Rishon Lezion (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,836
(22) PCT Filed: Feb. 25, 1997
(86) PCT No.: PCT/IL97/00071
§ 371 Date: Jan. 20, 1999
§ 102(e) Date: Jan. 20, 1999
(87) PCT Pub. No.: WO97/31781
PCT Pub. Date: Sep. 4, 1997

(30) Foreign Application Priority Data

Feb. 27, 1996 (IL) .......................................... 117278

(51) Int. Cl.⁷ ............................... B41J 2/145; B41J 2/15; B41J 29/38
(52) U.S. Cl. ................................. 347/41; 347/12
(58) Field of Search ................... 347/41, 15, 14, 347/12

(56) References Cited

U.S. PATENT DOCUMENTS

| | | | |
|---|---|---|---|
| 4,622,560 | * 11/1986 | Withoos et al. | 347/12 |
| 4,680,596 | * 7/1987 | Logan | 347/15 |
| 4,920,355 | * 4/1990 | Katerberg | 347/41 |
| 5,070,345 | 12/1991 | Lahut et al. | 347/41 |
| 5,239,312 | 8/1993 | Merna et al. | 347/41 |
| 5,300,950 | 4/1994 | Lopez et al. | 347/41 |
| 5,483,268 | * 1/1996 | Fujimoto | 347/37 |
| 5,625,390 | * 4/1997 | Burke et al. | 347/41 |
| 5,734,393 | * 3/1998 | Eriksen | 347/41 |

FOREIGN PATENT DOCUMENTS

| | | |
|---|---|---|
| 0 023 433 | 2/1981 | (EP) . |
| 422 924 A2 | 4/1991 | (EP) . |
| 497 614 A2 | 8/1992 | (EP) . |
| 564 252 A2 | 10/1993 | (EP) . |
| 567 288 A2 | 10/1993 | (EP) . |
| 568 283 A1 | 11/1993 | (EP) . |
| 677 390 A1 | 10/1995 | (EP) . |

OTHER PUBLICATIONS

Patent Abstracts of Japan, Saito Seiji, Sato, Koji, Ayada, Naoki; Title "Recorder", Applicant Canon Inc; Publication No. 56084970, Publication date: Oct. 7, 1981, Application date: Nov. 12, 1979, Application No. 54161014.

* cited by examiner

*Primary Examiner*—Thinh Nguyen
(74) *Attorney, Agent, or Firm*—Nath & Associates PLLC; Gary M. Nath; Harold L. Novick

(57) ABSTRACT

A method of operating for an ink jet printer having a printer head bearing a plurality of equi-distantly spaced ink jets for printing parallel lines of dots on a substrate in n passes of the print head over the substrate. Between each pass of the printer head over the substrate, the printer head is displaced in a direction perpendicular to the direction of the lines by a distance y that satisfies: (i) $y = m_1 \times a$ where $m_1$ is a natural number equal to 2 or more and a is the separation gap between adjacent lines; (ii) y is not a multiple of the inter ink jet separation distance of the printer head; and (iii) $m_1$ and n do not have a common factor except the factor with the value of 1. These conditions on y ensure that two adjacent lines are printed by different ink jets and that each line is printed by only one ink jet.

8 Claims, 8 Drawing Sheets

METHOD FOR OPERATING AN INK JET PRINTER

FIELD OF THE INVENTION

The present invention relates to a method of operation for direct computer-to-print printing systems in general and ink jet printers in particular.

BACKGROUND OF THE INVENTION

In EP 0 023 433, there is illustrated and described a high speed ink jet printer of the rotatable drum type having a print head for printing an image on a substrate during n printing passes where b=n×a, "b" is the ink jet head separation gap between adjacent ink jet heads and "a" is the inter ink dot line separation gap between adjacent ink dot lines i.e. a pixel length, each printing pass being constituted by a drum revolution and the displacement of the print head along the substrate through a step equivalent to the pixel length between consecutive drum revolutions.

FIG. 1 shows an ellipse shaped image printed during three drum rotations of such an ink jet printer having 5 ink jet heads labelled A, B, C, D and E. For convenience, the ink dot lines printed by the different ink jet heads during each consecutive drum rotation are denoted by the reference numbers 1, 2 and 3. It can be readily appreciated that the image suffers from the drawback that a single defective ink jet head C having, say, a blocked nozzle, causes an unprinted band of a width equal to the inter ink jet head separation gap.

It is the object of the present invention to substantially overcome this and other disadvantages.

SUMMARY OF THE INVENTION

In accordance with the teachings of the present invention, there is provided a method of operation for a high speed ink jet printer having a print head for printing an image on a substrate, the print head being substantially coextensive with the substrate and displaceable relative thereto in substantially mutually orthogonal first and second directions, the method comprising the steps of:

(a) displacing the print head in the first direction between initial and final printing positions for printing ink dot lines on the substrate in a manner determined by the appearance of the image to be printed;

(b) displacing the print head in the second direction through a step "y" between consecutive initial printing positions of the print head; and (c) repeating steps (a) and (b) during n printing passes where b=n×a, "b" is the ink jet head separation gap between adjacent ink jet heads and "a" is the inter ink dot line separation gap between adjacent ink dot lines at the predetermined line resolution;

characterized in that the step "y" satisfies the following conditions:

(i) $y=m_1 \times a$ where $m_1$ is a natural number equal to 2 or more, (ii) $y \neq m_2 \times b$ where $m_2$ is a natural number equal to 1 or more, (iii) $b=m_3 \times a$ where $m_3$ is a natural number equal to 2 or more and (iv) $m_1$ and $m_3$ do not have a common denominator.

In accordance with the teachings of the present invention, the displacement of the print head relative to the substrate through a step greater than the inter ink dot line separation gap entails that adjacent ink dot lines are printed by different ink jet heads. The main advantage provided for by this method of operation is that in the case of an inoperative ink jet head, the ink dot lines which it should have printed are spaced out along the image rather than being adjacent to one another in an unprinted band as hitherto occurs with a conventional ink jet printer as described hereinabove such that their detrimental effect on image quality is considerably less noticeable.

This method of operation requires a longer print head for printing the same size image as a conventional ink jet printer. This is because, at any one time, one or more ink jet heads are positioned in inoperative printing positions either to the left or right of a substrate. Thus, during the printing of an image, some or all of the ink jet heads in initially inoperative printing positions are displaced to operative printing positions whilst some or all of the ink jet heads in initially operative printing positions are displaced to inoperative printing positions. Some conventional ink jet printers can be retro-fitted so as to operate in the above described manner for printing narrower than usual images.

The spacing between consecutive ink dot lines printed by a particular ink jet head, i.e. the length of the step "y" by which a print head is displaced relative to a substrate in the second direction, is not arbitrary but rather must comply with a number of constraints as now described assuming that all parameters are in the same units. The first constraint to be complied with is that the spacing between consecutive ink dot lines of a particular ink jet head is equal to a multiple of the separation gap "a" between adjacent ink dot lines at a desired line resolution, namely, $y=m_1 \times a$ where $m_1$ is a natural number greater than one. The second constraint to be complied with is that the spacing between consecutive ink dot lines of a particular ink jet head is not equal to a multiple of the inter ink jet head separation gap "b", namely, $y \neq m_2 \times b$ where $m_2$ is a natural number greater than zero, such that ink jet heads do not assume previously occupied positions relative to a substrate. The third constraint to be complied with and which also applies to conventional ink jet printers is that the inter ink jet head separation gap "b" is a multiple of the inter ink dot line separation gap "a" at a particular desired line resolution, namely, b=n×a where n is a natural number greater than zero. However, in addition, in view of the first constraint $y=m_1 \times a$, also $m_1 > n$ and $m_1$ and n do not have a common factor such that ink jet heads do not assume previously occupied positions.

In line with conventional practice, an ink jet printer operative in accordance with the teachings of the present invention can preferably print at one or more preset line resolutions, for example, a low line resolution of, say, 40 lpi or a high line resolution of, say, 60 lpi, the trade-off for a higher resolution, of course, being in terms of a slower throughput. As is known in the art, for all such line resolution settings, the relationship b=n×a applies but for different values of n.

A further feature of an ink jet printer operative in accordance with the teachings of the present invention is that the unprinted ink dot lines caused by a defective ink jet head can be at least partially compensated for by suitable manipulation of partially printed ink dot lines in their vicinity so as to restore picture quality as perceived by an observer even when an ink jet printer has one or more defective ink jet heads. The compensation of an unprinted ink dot line can be achieved by printing a printed ink dot line adjacent to an unprinted ink dot line with either additional ink dots or larger ink dots, if possible, so as to restore the original dot percentage. In color ink jet printers, the above described compensation technique is applied for each primary color separately.

The detection of a defective ink jet head can be achieved by an operator during, say, a routine start-of-day work procedure. Alternatively, it can be achieved automatically by means of a dedicated ink jet head test module including image processing and pattern recognition capabilities for processing the image of a printed image as provided by a camera directed theretoward.

Also in line with conventional practice, an ink jet printer operative in accordance with the teachings of the present invention preferably prints an image as a matrix of cells, each cell in turn being printed as a matrix of pixels. As known in the art, a separation gap "c" between adjacent cells alone the direction in which the print head is intermittently displaced fulfills the following two relationships: $c=m_4 \times a$ and $b=m_5 \times c$ where $m_4$ and $m_5$ are natural numbers greater than zero. The spacing between consecutive ink dot lines of a particular ink jet head is preferably greater than the separation gap "c" such that a particular ink jet head prints a maximum of one ink dot line in any one cell. In this case, the compensation of an unprinted ink dot line is preferably performed at the cell level in the sense that ink dot lines within a cell containing an unprinted ink dot line are printed with either additional ink dots or larger ink dots, if possible, so as to restore the original dot percentage. In the case that an unprinted ink dot line occurs at the edge of a cell, its dot percentage may be restored by modifying the adjacent printed ink dot line in its neighboring cell.

Ink jet printers in accordance with the teachings of the present invention can either be of the rotatable drum type or the flat bed type. In addition, they can be of the "continuous" ink jet printer type in which each ink jet head provides a continuous flow of ink drops of which some impinge on a substrate at desired printing locations whilst others are disposed of in a manner determined by the appearance of an image to be printed or the "impulse" or "drop-on-demand" ink jet printer type in which each ink jet head is independently actuated to expel ink drops in a manner determined by the appearance of an image to be printed.

DESCRIPTION OF THE DRAWINGS

For a better understanding of the present invention and to show how the same can be carried out in practice, reference will now be made, by way of a non-limiting example only, to the accompanying drawings in which.

DETAILED DESCRIPTION OF THE DRAWINGS

Figure 2:
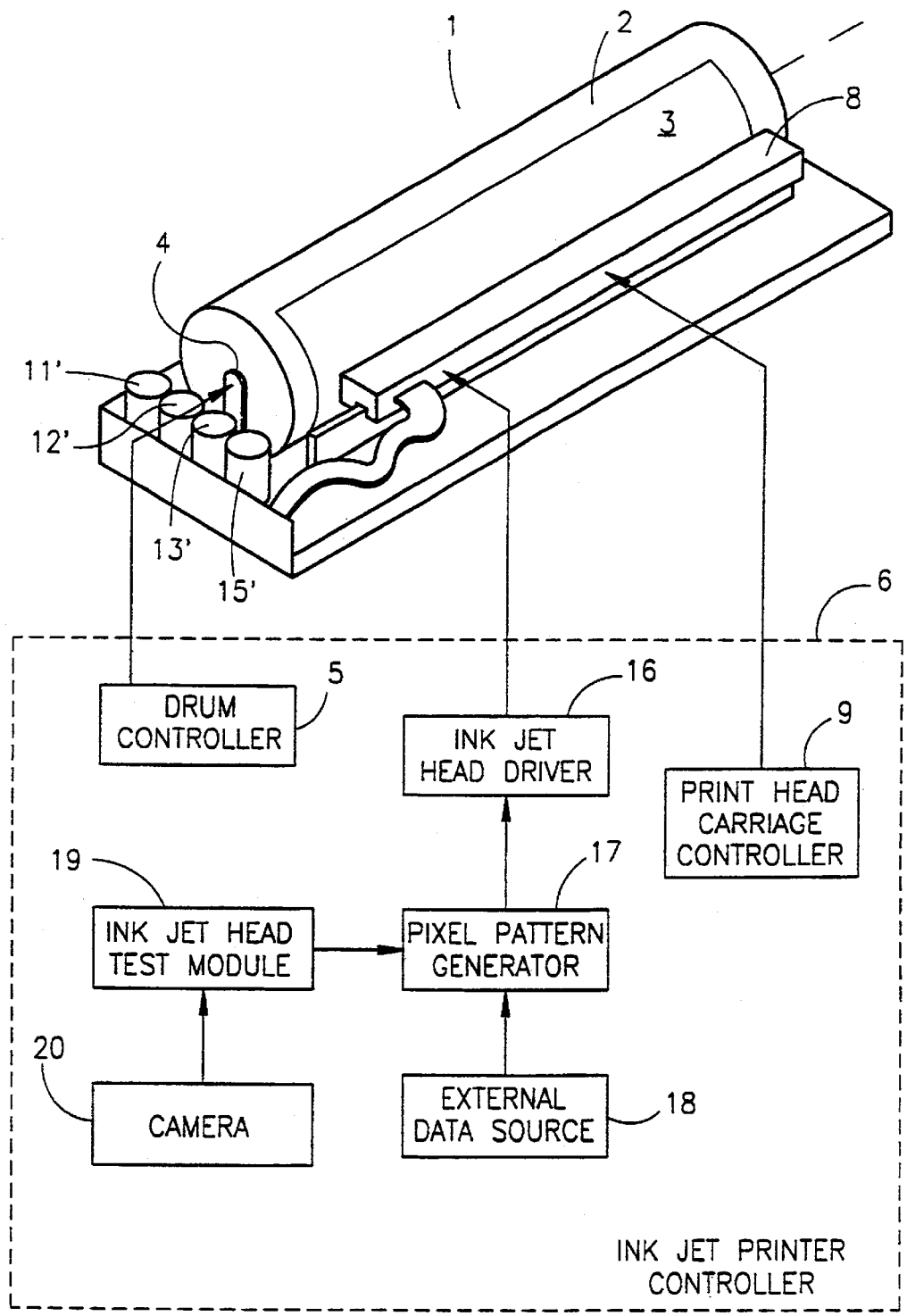
FIG. 2 is a schematic view of a rotatable drum type ink jet printer constructed and operative in accordance with the teachings of the present invention.

FIG. 2 shows an ink jet printer, generally designated 1, of the "drop-on-demand" type including a foraminous drum 2 bearing a removable substrate 3 preferably secured thereto by application of a vacuum to its underside. The drum 2 is rotatable about a shaft 4 under the control of a drum controller 5 constituting part of an ink jet printer controller 6 for controlling the operation of the ink jet printer 1. Each substrate 3 is loaded onto the drum 2 and unloaded therefrom in a conventional manner be it manual or automatic.

Figure 3:
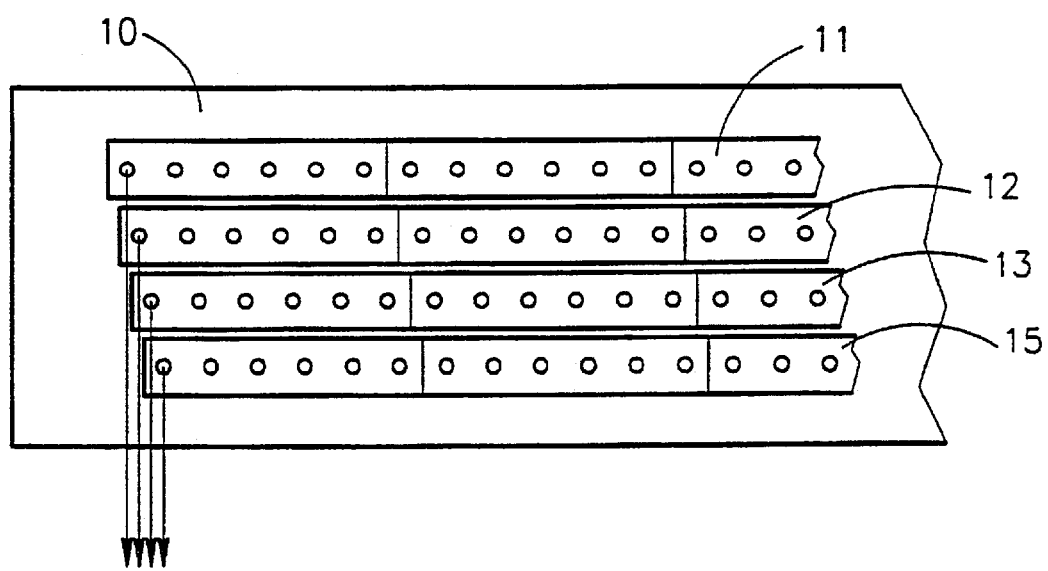
FIG. 3 is a front view of the print head of the ink jet printer of FIG. 2 including four arrays of ink jet heads for four color process printing.

A print head carriage 8 is mounted parallel to the shaft 4 and is displaceable therealong under the control of a print head carriage controller 9. The print head carriage 8 includes a print head 10 which extends along the near entire length of the drum 2 corresponding to the maximum width of substrate 3 to be printed thereon. As shown in FIG. 3, the print head 10 includes four ink jet head arrays 11, 12, 13 and 15 for printing the four primary CMYK colors, namely, cyan, magenta, yellow and black. Each ink jet head array 11, 12, 13 and 15 is supplied with ink from a dedicated ink reservoir 11', 12', 13'and 15', respectively. The ink jet heads of the different arrays are not in registration with one another so as to ensure that they do not superimpose differently colored ink dot lines which would tend to mix, thereby lowering print quality.

Individual ink jet heads are actuated by an ink jet head driver 16 driven by a pixel pattern generator 17 which determines which pixels of a particular cell are to be filled by dots and the dot area of each of the selected dots in accordance with the dot percentage values of each color in that cell. The pixel pattern generator 17 includes a library of patterns for generating different dot percentages. In some cases, the library only contains a single pattern to achieve a particular dot percentage, for example, 0% dot percentage or 100% dot percentage. However, in practice, each cell is represented by a m×n pixel matrix, say, 6×6, such that there are a large number of possible patterns to achieve a particular dot percentage of, say, 40% dot percentage. For example, in a simplified case, there are four patterns which achieve a 25% dot percentage in a 2 by 2 cell matrix, namely, a dot in one corner of the cell matrix. Input to the pixel pattern generator 17 is provided from an external data source 18, for example, removable media i.e. an optical disk, or a desk-top publishing (DTP) system.

The operation of the ink jet heads of the print head 10 is monitored by an ink jet head test module 19 including image processing and pattern recognition capabilities for processing the image of a printed image as provided by on-line or off-line image acquisition apparatus, say, a camera 20, directed theretoward. In the case that one or more ink jet heads are found to be defective, typically, due to a blocked nozzle, the ink jet head test module 19 updates the pixel pattern generator 17 accordingly such that certain patterns which would require the actuation of defective ink jet heads are temporarily degenerated.

Figure 4A:
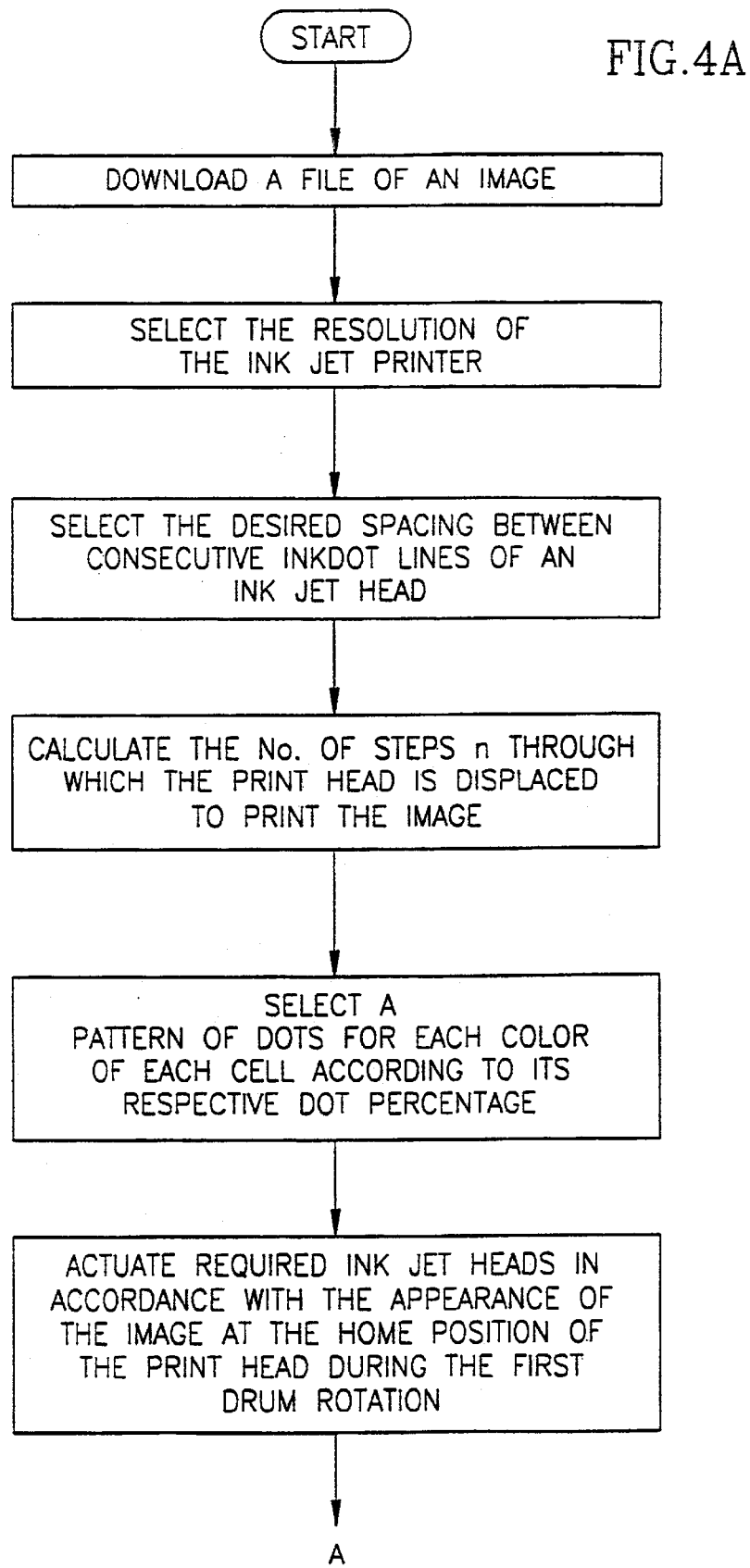
FIGS. 4A and 4B are a flow chart illustrating the method of operation for the ink jet printer of FIG. 2, FIG. 4B being a continuation of FIG. 4A.
Figure 4B:
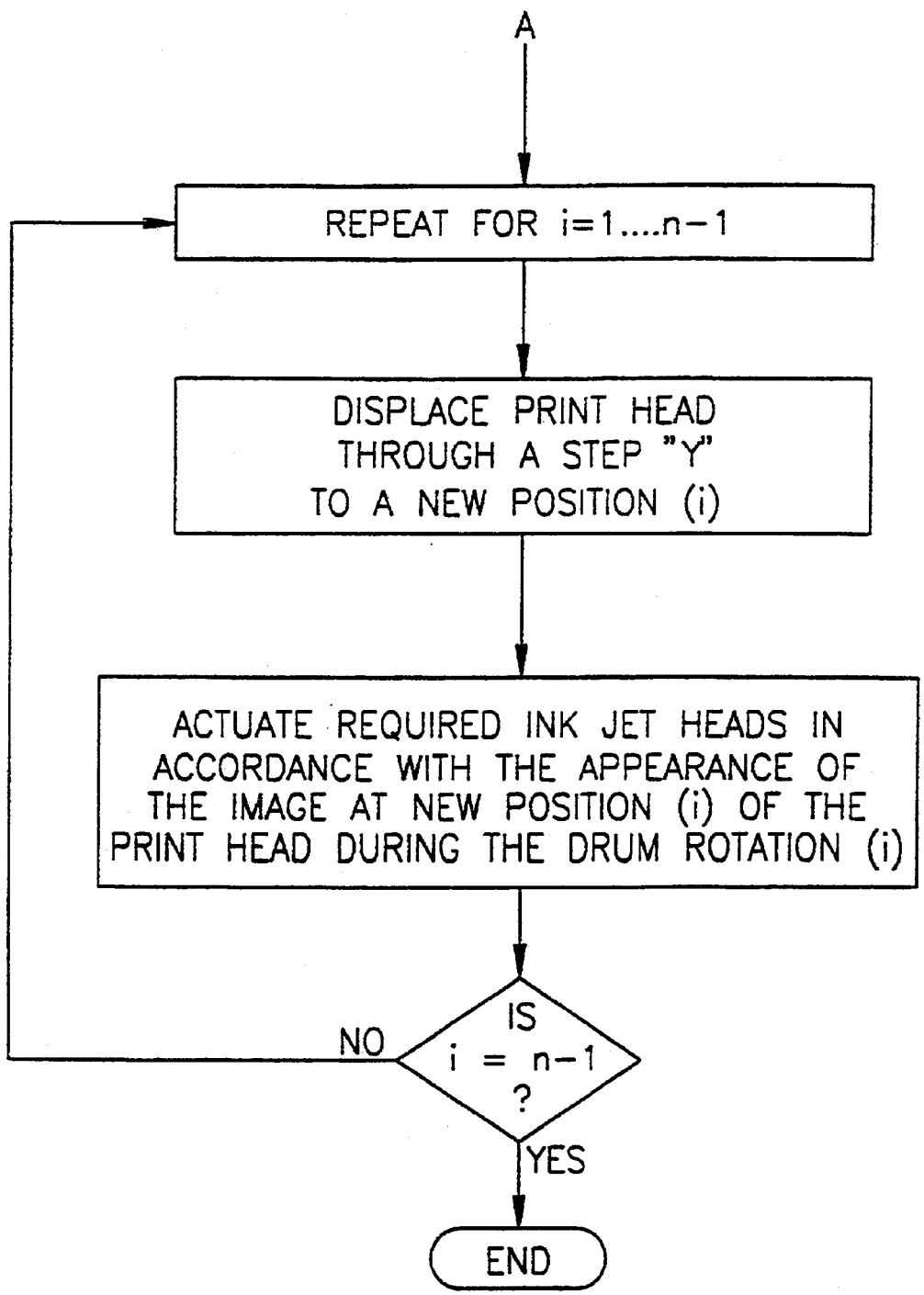

The principles of operation of the ink jet printer 1 are now described with reference to FIGS. 4A and 4B. First, an operator downloads a file containing a pixelized image to be printed from a suitable source, for example, an optical disk. The operator then selects the desired line resolution at which the image is to be printed from the available range of line resolutions of the ink jet printer 1. Finally, the operator selects the desired spacing between consecutive ink dot lines of an ink jet head from the available range of spacings which, in turn, dictates the length of the step "y" through which the print head carriage 8 is displaced between consecutive rotations of the drum 2.

Based on his selections, the ink jet printer controller 6 determines the number of steps n through which the print head carriage 8 is required to be displaced so as to print an image of a predetermined width at the predetermined line resolution. Thereafter, the pixel pattern generator 17 selects a pattern of dots for each color of each cell according to its dot percentage from its library. The pixel pattern generator 17 provides the patterns to the ink jet head driver 16 which actuates the required ink jet heads in accordance with the appearance of the image to be printed during successive rotations of the drum 2 whist advancing the print head carriage 8 through the step y between consecutive drum rotations.

Figure 1:
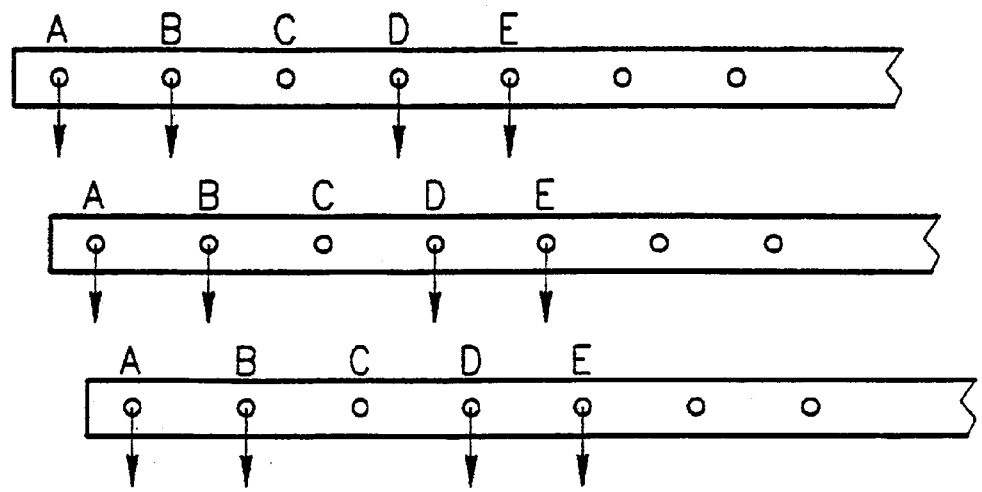
FIG. 1 illustrates an ellipse shaped image printed by a conventional ink jet printer having a defective ink jet head in the form of a blocked nozzle.
Figure 1:
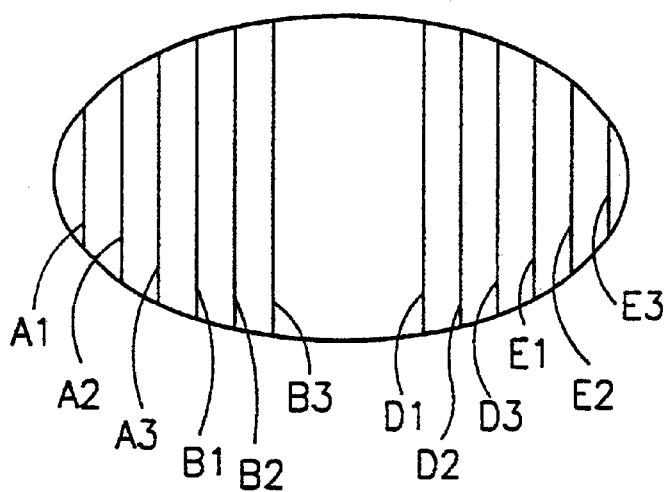
Figure 5:
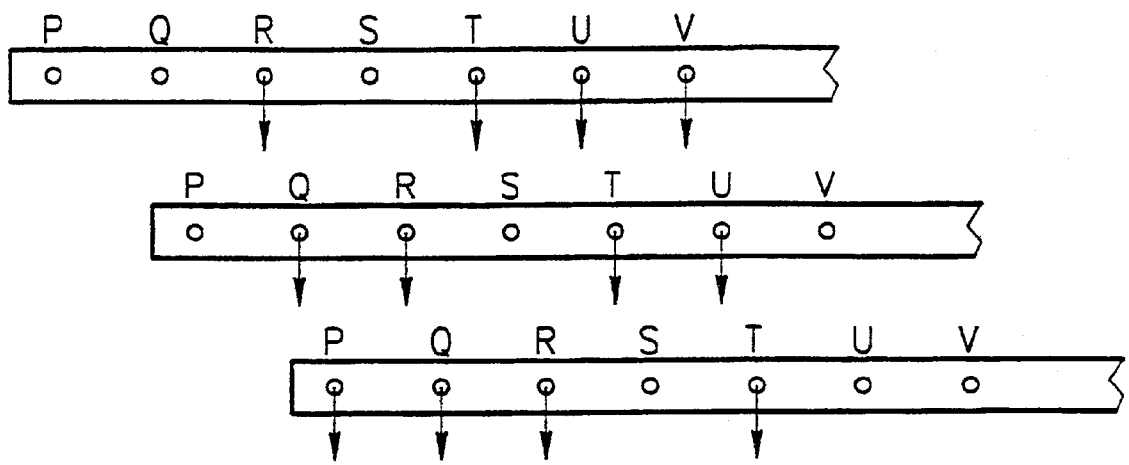
FIG. 5 illustrates the same ellipse shaped image printed by the ink jet printer FIG. 2 having a defective ink jet head in the form of a blocked nozzle.
Figure 5:
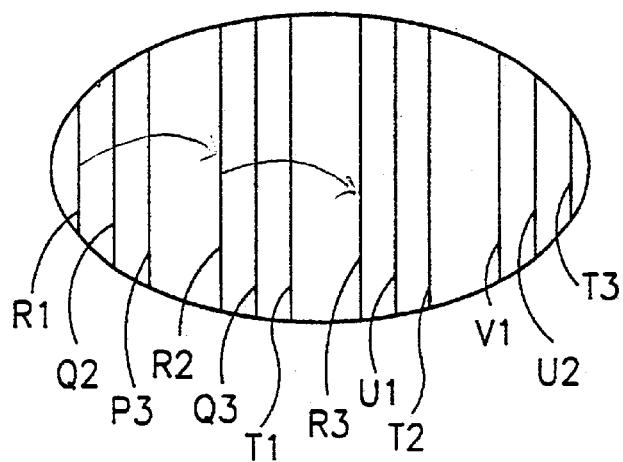

An example of the operation of the ink jet printer 1 is shown in FIG. 5 for printing the same ellipse shaped image as shown in FIG. 1 during the same three drum rotations. As before the ink jet lines printed during each drum rotation are designated by the reference numbers 1, 2 and 3 for the first, second and third drum rotations, respectively. The print head 10 includes 7 ink jet heads labelled P, Q, R, S, T, U and V of which the ink jet heads P and Q are located in initially inoperative printing positions and ink jet heads R, S, T, U and V are located in initially operative printing positions in the initial home position of the print head carriage 8.

Thus, in this case, for a step "y" equivalent to the separation gap between four ink dot lines, printing, of the ellipse shaped image is achieved by actuating the ink jet heads R, S, T, U and V in the initial home position of the print head carriage 8 during the first drum rotation, actuating the ink jet heads Q, R, S. T and U during, the second drum rotation and actuating the ink jet heads P. Q, R, S and T during the third and final drum rotation. It can therefore be readily seen that whilst the ink jet heads P and Q are displaced from inoperative printing positions to operative printing positions during the advancement of the print head carriage 8, the ink jet heads U and V are displaced from operative printing positions to inoperative printing positions.

In the case that the ink jet head S is defective with a blocked nozzle, it will be readily noticed that the unprinted ink dot lines shown dashed and labelled S1, S2 and S3 caused thereby are spaced apart and therefore less conspicuous to an observer than in the case that they were adjacent to one another as hitherto occurred as described in the Background of the Invention as can be best appreciated by comparing the ellipse shaped image shown in FIG. 5 to its counterpart in FIG. 1.

Figure 6A:
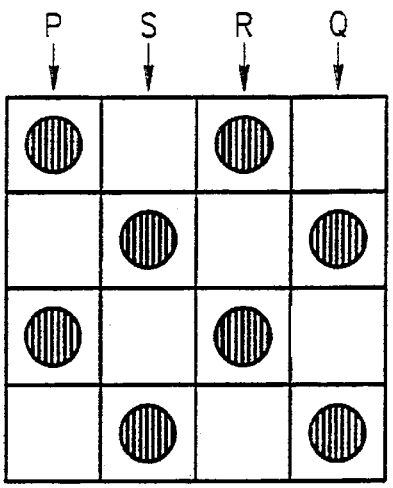
FIGS. 6A–6C illustrate the operation of the ink jet printer of FIG. 2 for correcting the image of FIG. 5.
Figure 6B:
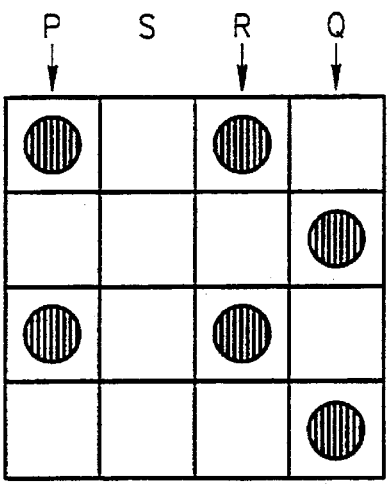
Figure 6C:
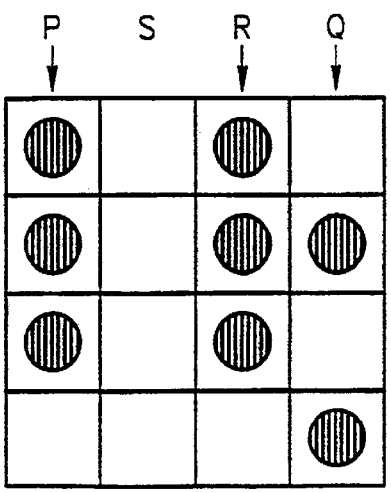

The image quality of the ellipse shaped image shown in FIG. 5 can be further improved by the ink jet head test module 19 as now explained. For example, assuming that all the ink jet heads P, Q, R and S are operative, FIG. 6A shows a 4 by 4 pixel cell having, say, a 50% dot percentage value achieved by each of the ink dot lines printed by their respective ink jet heads containing two ink dots as determined by the pixel pattern generator 17. However, as evidenced in FIG. 6B, the same cell would only have a slightly less than, say, 30% dot percentage value in the case that the ink jet head S is inoperative. In such an event, the ink jet head test module 19 would update the pixel pattern generator 17 as to the status of the ink jet head S such that the pixel pattern generator 17 can instruct the ink jet head driver 16 to actuate the operative ink jet heads P, R and Q so as to print the cell with the desired 50% dot percentage value, for example, as shown in FIG. 6C.

Figure 7:
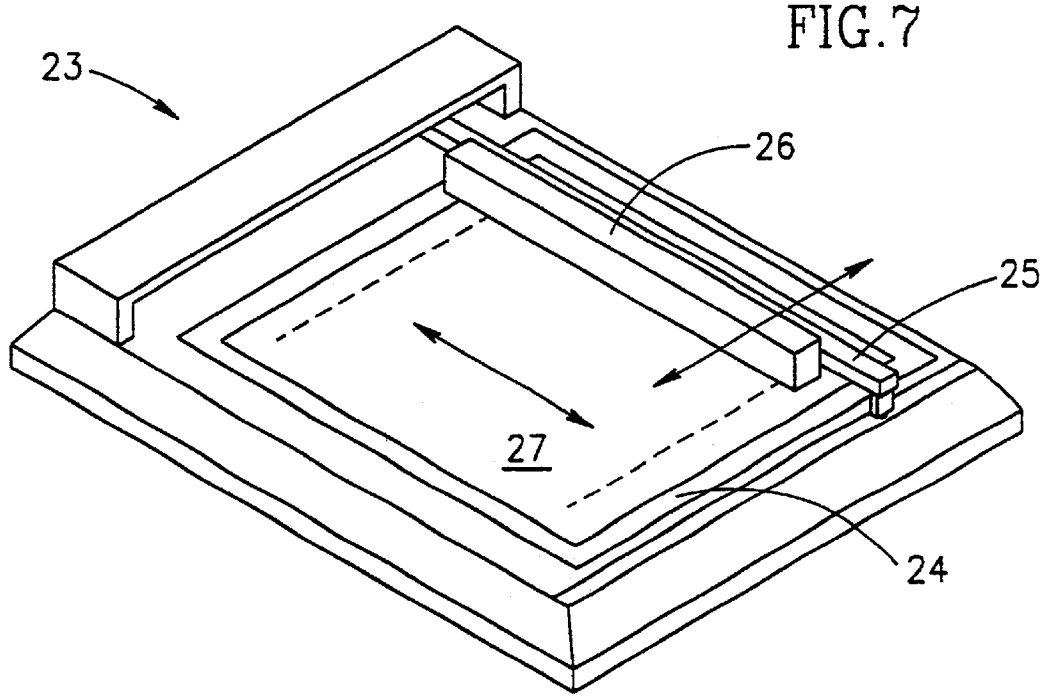
FIG. 7 is a schematic view of a flat bed type ink jet printer constructed and operative in accordance with the teachings of the present invention.

FIG. 7 shows a flat bed type ink jet printer 23 having a substrate bearing flat bed 24 which performs a reciprocating motion in a first direction and a print head carriage 25 carrying a print head 26 with ink jet heads for printing parallel ink dot lines on a substrate 27 during a forward stroke of the flat bed 24. Thus, in this case, printing of an image is achieved by repeatedly returning the flat bed 24 to its home position by a return stroke, advancing the print head carriage 25 in a traverse direction relative to the flat bed 24 by a step "y" as described hereinabove and actuating the ink jet heads at each new position whilst displacing the flat bed 24 through a forward stroke so as to build up the image over a number of forward strokes of the flat bed 24. For the economy of time, it will be readily appreciated that the return stroke of the flat bed 24 and the step advancement of the print head carriage 25 can be performed simultaneously.

While the invention has been described with respect to a limited number of embodiments, it will be appreciated that many variations, modifications and other applications of the invention can be made by those ordinarily skilled in the art.

What is claimed is:

1. A method of operation for an ink jet printer having a print head defining a printing width between the first and last ink jet heads for printing an image on a substrate at a predetermined line resolution, the print head extending in a second direction along the near entire width of substrate bearing means and being displaceable relative to the substrate in substantially mutually orthogonal first and said second directions, the method comprising the steps of:
   (a) displacing the print head in the first direction between initial and final printing positions for printing ink dot lines along the entire length of the substrate in said first direction as a function of the appearance of the image to be printed;
   (b) displacing the print head in the second direction through a step y between consecutive initial printing positions of the print head; and
   (c) repeating steps (a) and (b) during n printing passes where b=n×a, b is the ink jet head separation gap between adjacent ink jet heads and a is the inter ink dot line separation gap between adjacent ink dot lines at the predetermined line resolution where n is a natural number equal to 1 or more;
   characterized in that the printing width of the print head is wider than the image to be printed and the step y satisfies the following conditions:
   (i) y=$m_1$×a where $m_1$ is a natural number equal to 2 or more,
   (ii) y≠$m_2$×b where $m_2$ is a natural number equal to 1 or more,
   (iii) $m_1$ and n do not have a common factor except the factor with the value of 1.

2. The method according to claim 1 wherein the printed image is constituted by a matrix of cells where c is the separation gap between adjacent cells constituting the printed image, wherein: c=$m_4$×a; $m_4$ is a natural number equal to 2 or more; and y>c.

3. The method according to claim 2 further comprising the steps of:
   (d) off-line detecting a reduced gray level within a portion of the printed image constituted by one or more cells; and
   (e) adjusting a dot percentage of one or more cells constituting the portion so as to substantially restore the gray level to a predetermined value.

4. The method according to claim 1 wherein y>b.

5. The method according to claim 1 wherein the ink jet printer is operative in a drop-on-demand mode of operation.

6. The method according to claim 1 wherein the ink jet printer is operative in a continuous mode of operation.

7. The method according to claim 1 wherein the method is operative for a rotatable drum type ink jet printer.

8. The method according to claim 1 wherein the method is operative for a flat bed type ink jet printer.

\* \* \* \* \*